A. B. LAMB AND P. W. CARLETON.
RESPIRATOR.
APPLICATION FILED APR. 25, 1919.
1,366,392.
Patented Jan. 25, 1921.
3 SHEETS—SHEET 1.
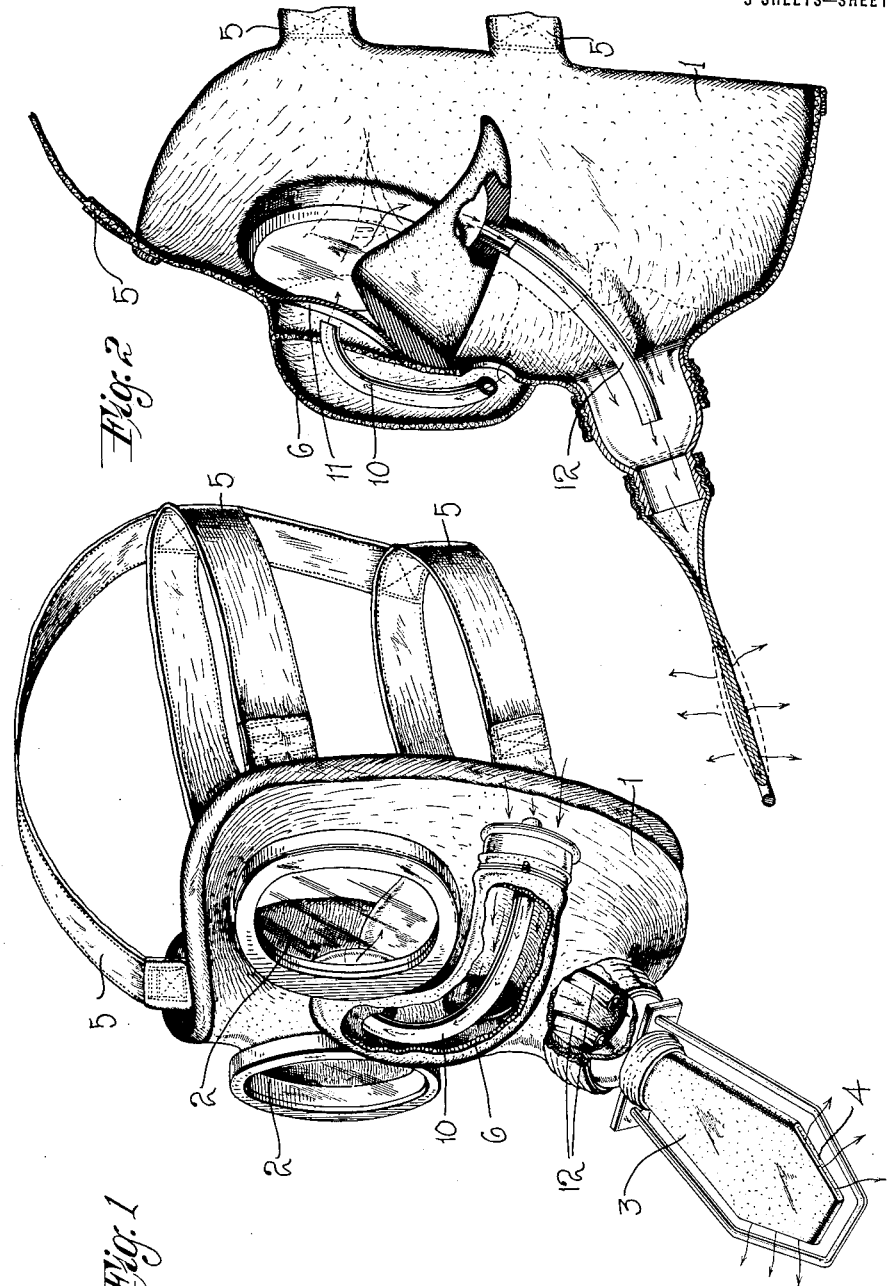
Arthur B. Lamb
Paul W. Carleton INVENTORS A. B. LAMB AND P. W. CARLETON.
RESPIRATOR.
APPLICATION FILED APR. 25, 1919.
1,366,392.
Patented Jan. 25, 1921.
3 SHEETS—SHEET 2.
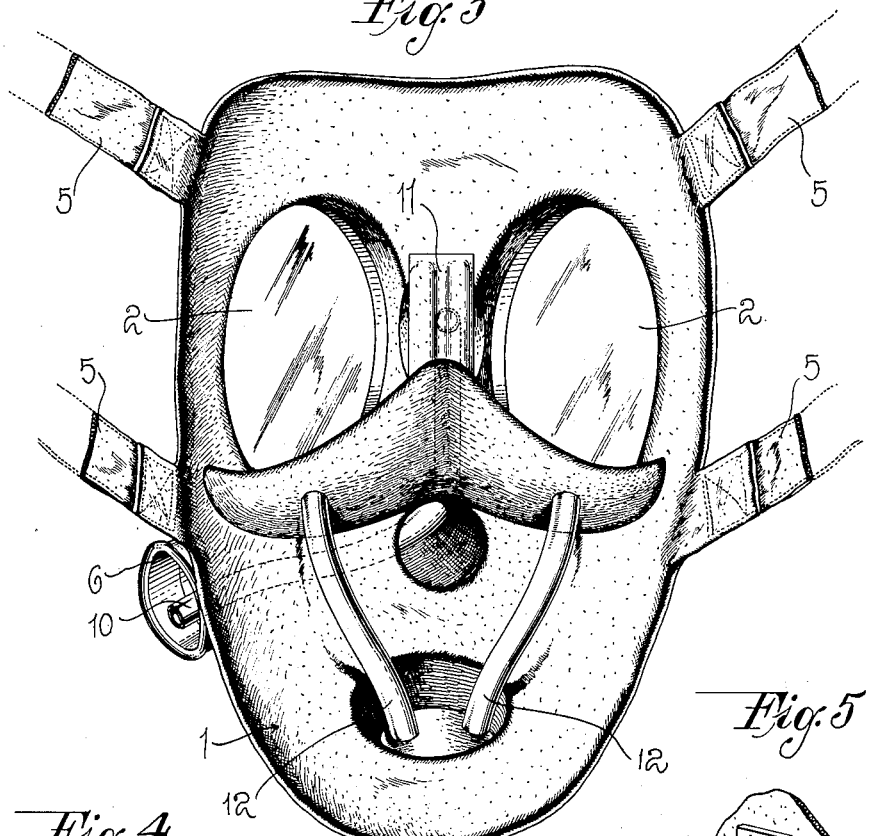
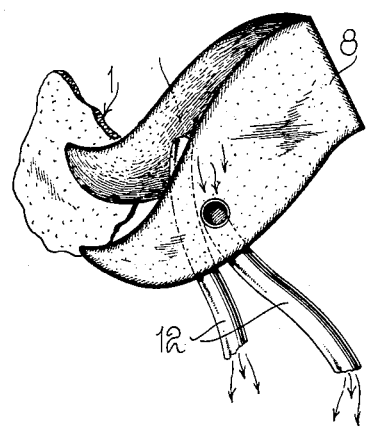
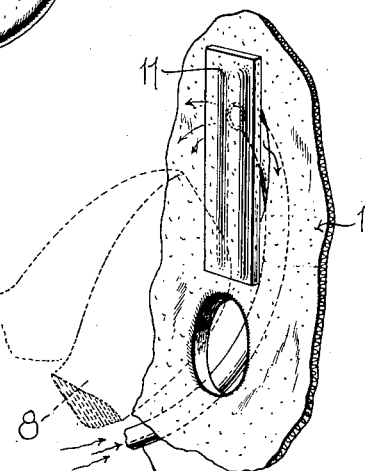
INVENTORS
Arthur B. Lamb
Paul W. Carleton

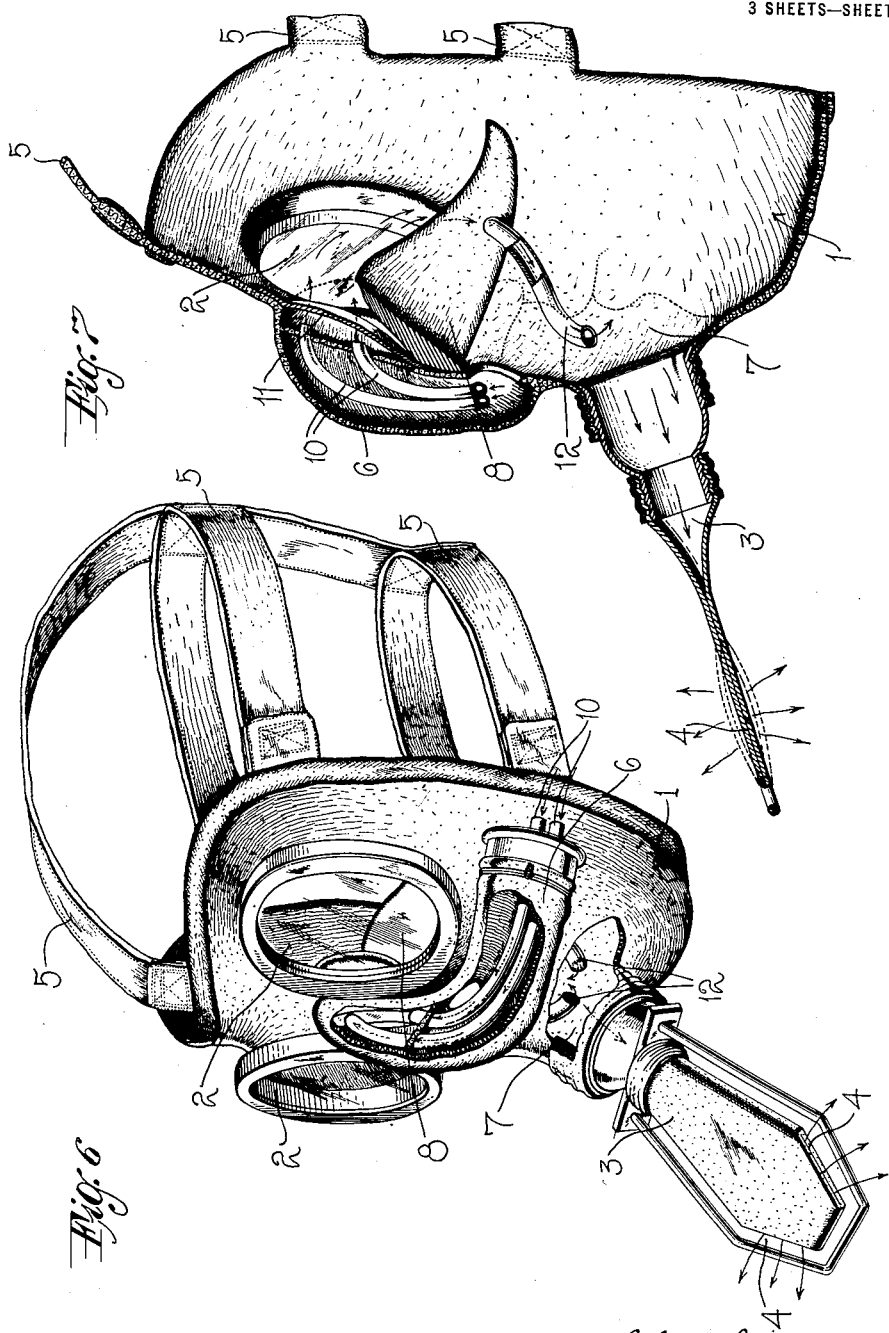

UNITED STATES PATENT OFFICE.

ARTHUR B. LAMB, OF WASHINGTON, DISTRICT OF COLUMBIA, AND PAUL W. CARLETON, OF WILMINGTON, DELAWARE.

RESPIRATOR.

1,366,392.

Specification of Letters Patent.

Patented Jan. 25, 1921.

Application filed April 25, 1919. Serial No. 292,591.

*To all whom it may concern:*

Be it known that we, ARTHUR B. LAMB and PAUL W. CARLETON, citizens of the United States, and residing at Washington, District of Columbia, and Wilmington, Delaware, respectively, have invented new and useful Improvements in Respirators, of which the following is a specification.

This invention relates to respirators of the type wherein air for breathing is first passed over the lenses to remove moisture which ordinarily accumulates by evaporation from the skin and eyes and by reason of exhaled air impinging on the lenses and depositing some of its contained moisture. Respirators of this type, hitherto used have not been satisfactory by reason of the fact that with each breath exhaled air, especially in cold weather, would strike the lenses condensing water which would be more or less cleared up by the succeeding inhaled air. This alternate dimming and clearing up obstructs the vision periodically and strains the eye making it difficult to wear the respirator for any length of time, and it is an object of this invention to so construct the respirator that no dimming of the lenses takes place even in very cold weather.

To obviate these disadvantages, we provide a respirator in which the exhaled air is not allowed to come in contact with the lenses. To accomplish this, we provide a diaphragm within the mask to at least partially separate the eyes from the nostrils and mouth. For convenience, we designate the spaces so formed as eye space and mouth space, respectively. We place the diaphragm so as to substantially completely separate the eyes from the mouth, and connect the two spaces thus formed in such a manner that fresh air will freely circulate over the lenses but substantially no exhaled air is allowed to pass into the eye space.

In carrying our invention into effect, we provide the diaphragm as above stated and so construct the respirator that a large portion of the incoming air passes through into the mouth space and another portion is bypassed into the eye space and serves to keep the lenses clear of moisture. Passages are provided leading from the eye space to the exhaust passage and serve to keep up the circulation of air over the lenses. The resistance of the device to the passage of air is small, thus allowing of free, unobstructed breathing.

The accompanying drawings illustrate certain types of respirator with a specific embodiment of our invention shown in Figure 1 which is a perspective view of the gas mask with parts broken away to show the interior construction, this type of respirator being provided with a single intake passage leading to the eye space of the respirator; Fig. 2 shows a vertical section through the mask taken on a central line through the intake and exhaust openings; Fig. 3 is an interior view of the mask; Fig. 4 is a detail view showing the arrangement of the diaphragm and the tubes leading therefrom to the exhaust openings; Fig. 5 is a detail view of the deflector which causes the incoming air to impinge on the lenses; Fig. 6 is a view similar to Fig. 1 and shows a modification wherein a plurality of intake passages extend to the eye space of the respirator; Fig. 7 is a vertical section through the modified mask shown in Fig. 6.

The face piece (1) contains the usual lenses (2), exhaust tube (3), and flutter valve (4), and is adjusted to the head of the wearer by flexible elastic bands (5). The intake passage (6) connects at one end to a canister or a tube leading to a canister while its other end leads directly into the mouth space (7) formed by the diaphragm (8). A relatively small tube (10) is placed within the intake passage (6) and connects to the eye space through the opening (11). Tubes (12) extend downwardly from the eye space through the diaphragm to the exhaust tube (3). In operation, a large portion of the inhaled air passes through the passage (6) directly into the mouth space of the respirator to be breathed, and on exhalation passes out through the exhaust tube (3) and its flutter valve. Another portion is drawn into the tube (10) by the process of breathing and passes through the opening (11) and over the lenses, keeping them free of moisture, then out through the tubes (12) into the mouth chamber (7). By exhalation the air passes from the mouth chamber into the exhaust chamber (3) and then through the flutter valve (4) into the open.

From the foregoing it is apparent that our invention, by providing a device wherein the eye space is so sealed from the mouth space as to prevent the exhaled air from backing up into the eye space, and still allowing of the unobstructed passage of inhaled air, obviates the disadvantages of prior respirators in a very simple manner. We do not intend to limit ourselves to the specific embodiment above described but we contemplate various modifications as within the scope of our invention. For example, the additional passage (10) need not be relatively small and may consist of a plurality of tubes. The tubes (12) need not necessarily extend into exhaust tube (3), but may terminate short of the same, and the air from these tubes be breathed. The exact construction, shape and location of the diaphragm and of the different passages may be varied and they may be made integral with the face piece of the respirator.

Having thus described our invention, we claim as new:

1. In a respirator, means for effecting substantial exclusion of the exhaled air from the eye space of said respirator, said means comprising a diaphragm dividing the respirator into eye and mouth spaces, and a passage allowing only part of incoming air to pass over the lenses of said respirator.

2. In a respirator, means for effecting substantial exclusion of the exhaled air from the eye space of said respirator, said means comprising a diaphragm dividing the respirator into eye and mouth spaces, a passage for incoming air directly connected to the mouth space and an additional passage to convey part of the incoming air into the eye space.

3. In a respirator, means for effecting substantial exclusion of the exhaled air from the eye space of said respirator, said means comprising a diaphragm dividing the respirator into eye and mouth spaces, a passage for incoming air directly connected to the mouth space and a passage of smaller cross-sectional area than the intake passage connecting said intake passage to the eye space for allowing air to pass over the lenses of said respirator.

4. In a respirator, means for effecting substantial exclusion of the exhaled air from the eye space of said respirator, said means comprising a diaphragm dividing the respirator into eye and mouth spaces, a passage for incoming air directly connected to the mouth space, a passage of smaller cross-sectional area than the intake passage connecting said intake passage to the eye space for allowing air to pass over the lenses and a passage leading from the eye space to the mouth space.

5. In a respirator, means for effecting substantial exclusion of the exhaled air from the eye space of said respirator, said means comprising a diaphragm dividing the respirator into eye and mouth spaces, a passage for incoming air directly connected to the mouth space, a tube within the intake passage connected to the eye space and a plurality of tubes passing through the diaphragm leading from the eye space to the exhaust tube.

6. In a respirator, means for effecting substantial exclusion of the exhaled air from the eye space of said respirator, said means comprising a diaphragm dividing the respirator into eye and mouth spaces, a passage for incoming air directly connected to the mouth space, a plurality of passages of smaller cross-sectional area than the intake passage connecting said intake passage to the eye space and disposed so as to allow air to pass over the lenses of said respirator and a plurality of passages leading from the eye space to the mouth space.

ARTHUR B. LAMB.
PAUL W. CARLETON.